United States Patent [19]

Kelley

[11] Patent Number: 5,709,167
[45] Date of Patent: Jan. 20, 1998

[54] FOWL FEED TRAY WITH LINER

[76] Inventor: Tony R. Kelley, 632 Rowland Rd., Bowdon, Ga. 30108

[21] Appl. No.: 710,034

[22] Filed: Sep. 11, 1996

[51] Int. Cl.[6] .................................................. A01K 39/00
[52] U.S. Cl. .............................. 119/61; 119/170; 119/168
[58] Field of Search .............................. 119/61, 165, 166, 119/167, 168, 169, 170, 458, 442, 471, 479; 206/567, 562, 594, 524.3

[56] References Cited

U.S. PATENT DOCUMENTS

| | | | |
|---|---|---|---|
| 3,809,013 | 5/1974 | Rigney et al. | 119/167 |
| 4,357,904 | 11/1982 | Kuihlumann | 119/442 |
| 4,646,685 | 3/1987 | Arenz | 119/168 |
| 4,706,606 | 11/1987 | Coppola | 119/165 |
| 4,721,040 | 1/1988 | Mau | 100/211 |
| 4,800,841 | 1/1989 | Yananton et al. | 119/168 |
| 4,890,576 | 1/1990 | James | 119/168 |
| 5,134,974 | 8/1992 | Houser | 119/168 |
| 5,179,912 | 1/1993 | Wu | 119/468 |
| 5,413,068 | 5/1995 | Segal | 119/537 |
| 5,488,929 | 2/1996 | Pierson | 119/170 |

*Primary Examiner*—Robert P. Swiatek
*Assistant Examiner*—Yvonne Abbott

[57] ABSTRACT

A fowl feed tray with liner (10) comprising: a first liner (12) which comprises a first liner left side (12A). The first liner left side (12A) is securely attached at one distal end to a proximal end of a first liner front (12B). The distal end of the first liner front (12B) is securely attached a proximal end of a first liner right side (12C) the distal end of the first liner right side (12C) is securely attached to a proximal end of a first liner rear (12D). The first liner left side (12A), first liner front (12B), first liner right side (12C), and first liner rear (12D) are attached to a first liner base (12F) along a common edge. The intersection of the sides forms a first liner corner (12E). The first liner corner (12E) comprises a plurality of first liner corner pleats (12EA) in alternating folds which function to permit the sides to fold upwardly forming a dish shape which is adapted to fit with in a feed tray (14). The first liner (12) is manufactured from a rigid, absorbent material. The rigidity of the material functions to retain the first liner left side (12A), first liner front (12B), first liner right side (12C), and first liner rear (12D) in a close cooperating relation with the feed tray sides (14B). The rigid material is necessary to keep the sides from falling inward. A second fowl feed tray with liner (110) wherein the juncture of the sides to each other comprises a second liner notch (112E). The second liner notch (112E) functions to permit the sides to fold upwardly forming a dish shape which is adapted to fit within a feed tray (14). The second liner (112) is manufactured from a rigid, absorbent material. The rigidity of the material functions to retain the second liner left side (112A), second liner front (112B), second liner right side (112C), and second liner rear (112D) in a close cooperating relation with the feed tray sides (14B). The rigid material is necessary to keep the sides from falling inward.

3 Claims, 2 Drawing Sheets

FOWL FEED TRAY WITH LINER

BACKGROUND OF THE INVENTION

1. Field of the Invention

The present invention relates to fowl feed trays. More particularly, the present invention relates to lining fowl feed trays to reduce cleaning labor.

2. Description of the Prior Art

The FDA has made a requirement of chicken breeder and hatcheries to use plastic trays to contain chicken feed for chicks. The plastic trays, in use, quickly become coated with chicken droppings which not only is unsanitary but is a problem to clean. The droppings tend to stick to the trays and require scrubbing and scraping to remove. The cleaning operation has added greatly to the cost of breading chickens.

Chicken breeders have been searching for a cost effective solution to reducing the increased cost due to the new regulation. The present invention describes such a cost effective solution.

Numerous innovations for Fowl Feed Tray with Liner have been provided in the prior art that are described as follows. Even though these innovations may be suitable for the specific individual purposes to which they address, they differ from the present invention as hereinafter contrasted.

In U.S. Pat. No. 5,488,929, titled Disposable Cat Litter Box Liner, invented by Susan K. Pierson and Stacy S. Pierson, a disposable cat litter box liner formed of flexible sheet material, preferably paper, is adapted to assume a generally flat configuration prior to use, a generally box-shaped configuration upon insertion into a cat litter box for holding litter therein, and a generally bag-shaped configuration upon removal from the litter box for disposing of the litter therein. The liner includes an arrangement of fold lines associated with the end panels for permitting the liner to be folded into a generally flat configuration prior to use. The liner includes a pair of elongate opposite top panels, which can advantageously include handles to facilitate lifting of the liner. When the top panels are clasped together and the liner lifted thereby with cat litter in the receptacle, the bottom panel collapses downward, the side panels collapse inward, and the liner assumes a generally bag-shaped configuration for disposal of cat litter therein.

The patented invention differs from the present invention because the patented invention has handles, located in a reinforced area, for lifting the liner from the litter box. The patented invention is made from a flexible paper material which is non-absorbent. The patented invention requires a complex folding from the original flat shape to achieve the designed shape. The present invention is made from absorbent material, lies flat when not in use and has simple pleated corners to aid shaping the liner to fit the feed tray.

In U.S. Pat. No. 5,413,068, titled Portable Bird Playgym, invented by Rene Segal, a portable bird playgym according to the present invention has a foldable frame that fits within a suitcase-like container suitable for storage and transportation. In operation, the cover of the container fits beneath the adjoining portion which operates as a catch basin for bird droppings. Disposable liners can be stored in a pouch disposed on the inner surface of the cover. Unfolding of the frame expands the structure providing angular climbing members and traverse support members suitable for exercising and perching. The bottom portion of the structure uses perpendicularly placed extensions to prevent the bird from reaching the catch basin. The top portion of the structure locks the components providing a substantially horizontal perching surface and provides an area for placement of a food and water bowl. A modified walkway is available to form a raised peak for the inquisitive perching bird.

The patented invention differs from the present invention because the patented invention is a full sized bird play gym having a lower tray which collects bird droppings. The tray has a disposable liner which does not extend up the sides of the try.

In U.S. Pat. No. 5,179,912, Titled Waste-receiving Plate for Chicken Cages, invented by Chuan-Chin Wu, a waste-receiving plate for chicken cages comprising a plate member and four feet supporting the plate member high above the ground, the plate member having many net-like holes, four receptacles for fitting with the feet to secure the feet with the plate member, and two large notches at both ends of a side to contact an inclined post of a chicken cage to secure the plate member on the feet, and many crossing ribs extending downward to reinforce the plate member to endure weight of any chicken wastes.

The patented invention differs from the present invention because the patented invention is a plate having openings therethrough. Chicken waists are dropped on the plate and retained, circulated air dries the waist products so that they can be handled as fertilizer. The patented invention is not a tray for feed and it does not have a liner which is disposable or absorbent.

In U.S. Pat. No. 4,646,685, Titled Disposable Litter Box and Sheet Assembly, invented by Mary M. Arenz, a litter box and sheet assembly, a panel of box-forming material, and a sheet secured to a central portion of the panel. The panel has side and end flaps free of the sheet which may be folded upwardly from a central portion of the panel to form a litter box for cats.

The patented invention differs from the present invention because the patented invention is a litter box assembly of complex design permitting assembly into a litter box shape and disassembly into a bag for disposal.

In U.S. Pat. No. 4,357,904, titled Conveyor for the Removal of Droppings for Battery-designed Poultry Cage Installations, invented by Josef H. Khulmann, the invention relates to a conveyor for the removal of poultry droppings, preferably for battery-designed poultry cage installations, the same running over dropping pans, equipped with scraper bars which are fastened to aligned swivel shafts at a right angle to the conveying direction, so that in one direction the bars are prevented from swiveling, thus conveying the droppings, while on the return movement are disengaged from the effective position of conveying, thus causing the same to glide over the droppings.

The patented invention differs from the present invention because the patented invention is a complex mechanized bird dropping removal system for use in highly automated chicken farming. It comprises a continuous belt and a scraper for removal of the dropping from the continuous belt.

Numerous innovations for Fowl Feed Tray with Liner have been provided in the prior art that are adapted to be used. Even though these innovations may be suitable for the specific individual purposes to which they address, they would not be suitable for the purposes of the present invention as heretofore described.

SUMMARY OF THE INVENTION

Chicken breeders currently use regulation mandated trays to contain feed for chicks and other young fowl. The young fowl eat and defecate in the trays which requires that the trays be cleaned. The harden droppings are difficult to remove, requiring scraping and soaking. This raises the cost of chicken production. Breeders have been searching for a way to reduce costs in the cleaning operation or eliminate the cleaning operation altogether.

The types of problems encountered in the prior art are that the trays are made from a plastic which provides a good bonding surface for fowl fecal material making it difficult to clean. The prior art has taught a paper liner that folds up for disposal of the contents, however, the resulting produce is expensive to produce and relies on the absorbency of the litter material.

In the prior art, unsuccessful attempts to solve this problem were attempted namely: a tray device to contain fowl feed, however, the fowl leave droppings in the feed tray which has to be cleaned. The present invention solves the cleaning problem by providing a removable liner which is also absorbent.

The present invention solved a long felt need to reduce the cost of compliance with regulations addressing the cleaning of fowl feed trays.

Accordingly, it is an object of the present invention to provide a cost effective method to avoid the cleaning of fowl feed trays.

More particularly, it is an object of the present invention to provide a liner for feed trays that is made from absorbent paper.

In keeping with these objects, and with others which will become apparent hereinafter, one feature of the present invention resides, briefly stated, in pleated corners which permit the sides of the liner to fold up to form a tray liner insert.

When the first fowl feed tray with liner is designed in accordance with the present invention, an absorbent liner is provided which can be easily shaped to fit fowl feed trays and is disposable.

In accordance with another feature of the present invention, is the liners can be rolled, separated by serrations or stored flat until ready for use.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS
UTILIZED IN THE DRAWING

10—first fowl feed tray with liner (10)
12—first liner (12)
12A—first liner left side (12A)
12B—first liner from (12B)
12C—first liner right side (12C)
12D—first liner rear (12D)
12E—first liner corner (12E)
12EA—first liner corner pleat (12EA)
12F—first liner base (12F)
12G—first liner insertion/removal direction (12G)
14—feed tray (14)
14A—feed tray bottom (14A)
14B—feed tray side (14B)
14C—feed tray rim (14C)

110—second fowl feed tray with liner (110)
113—second liner (112)
112A—second liner left side (112A)
112B—second liner front (112B)
112C—second liner right side (112C)
112D—second liner rear (112D)
112E—second liner notch (112E)
112F—liner base (112F)

BRIEF DESCRIPTION OF THE PREFERRED EMBODIMENT

DETAILED DESCRIPTION OF THE PREFERRED EMBODIMENT

Figure 1:
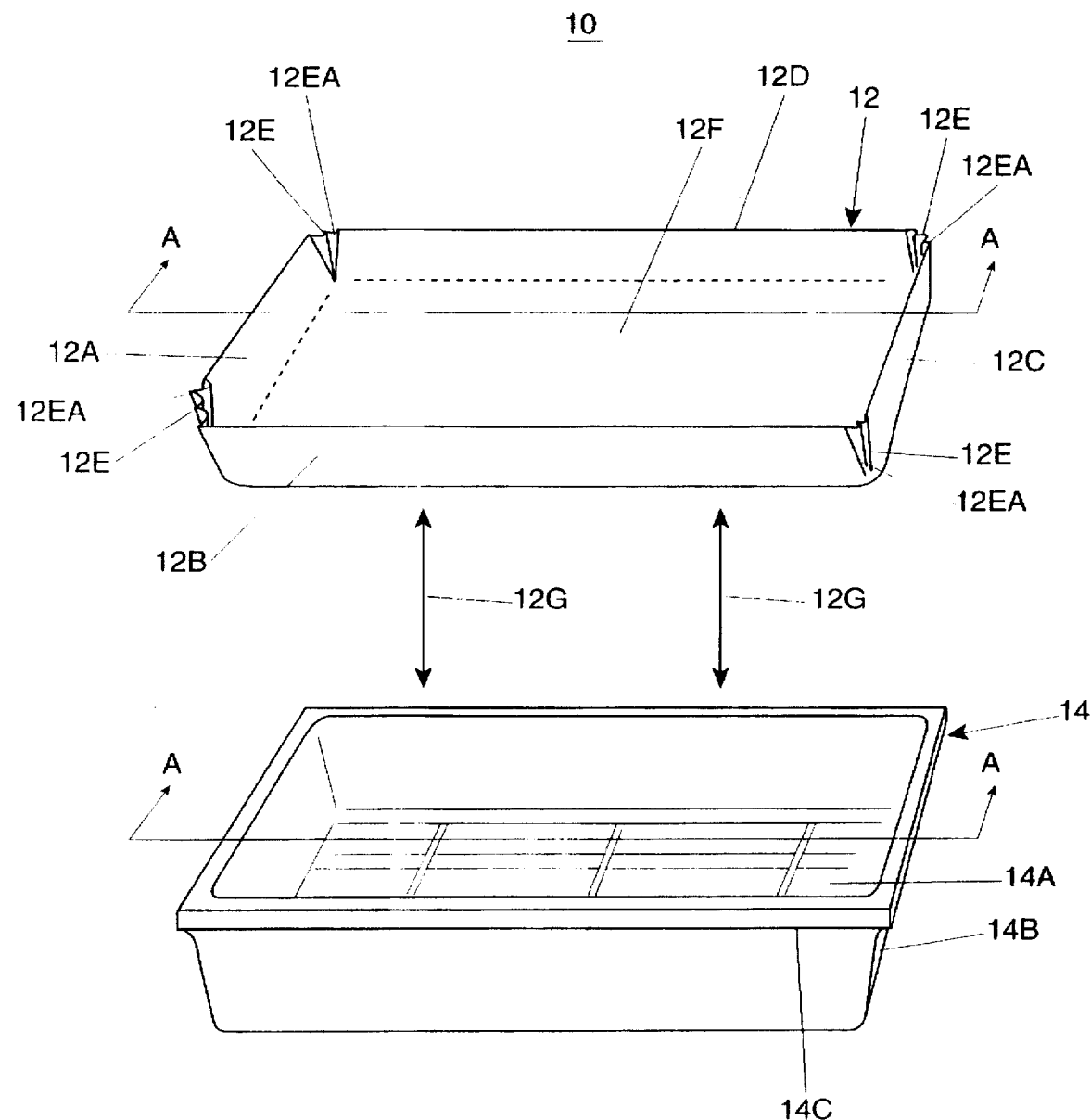
FIG. 1 is an exploded view of a first fowl feed tray with liner.

Referring to FIG. 1 which is an exploded view of a fowl feed tray with liner (10) having the following features: first liner (12), first liner left side (12A), first liner front (12B), first liner right side (12C), first liner rear (12D), first liner corner (12E), first liner corner pleat (12EA), first liner base (12F), first liner insertion/removal direction (12G), feed tray (14), feed tray bottom (14A), feed tray side (14B), and feed tray rim (14C).

A fowl feed tray with liner (10) comprises a first liner (12) comprising a first liner left side (12A) which is securely attached at one distal end to a proximal end of a first liner front (12B). The distal end of the first liner front (12B) is securely attached a proximal end of a first liner right side (12C) The distal end of the first liner right side (12C) is securely attached to a proximal end of a first liner rear (12D). The first liner left side (12A), first liner front (12B), first liner right side (12C), and first liner rear (12D) are attached to a first liner base (12F) along a common edge.

The juncture of the sides to each other comprises a first liner corner (12E). The first liner corner (12E) comprises a plurality of first liner corner pleats (12EA) in alternating folds which function to permit the sides to fold upwardly forming a dish shape which is adapted to fit with in a feed tray (14) when inserted along a first liner insertion/removal direction (12G). The feed tray (14) comprises a plurality of sides adapted in length and height to a close fit relationship with the first liner left side (12A), first liner front (12B), first liner right side (12C), and first liner rear (12D). The first liner base (12F) is adapted to fit within a feed tray bottom (14A). The first liner left side (12A), first liner front (12B), first liner right side (12C), and first liner rear (12D) do not extend above a feed tray side (14B) having a feed tray rim (14C) as a upper extremity.

The first liner (12) is manufactured from a rigid, absorbent material. The rigidity of the material functions of retain the first liner left side (12A), first liner front (12B), first liner right side (12C), and first liner rear (12D) in a close cooperating relation with the feed tray sides (14B). The rigid material is necessary to keep the sides from falling inward. The rigid, absorbent material is crape tissue which comprises a range of 60 gm/sqm to 140 gm/sqm.

Figure 2:
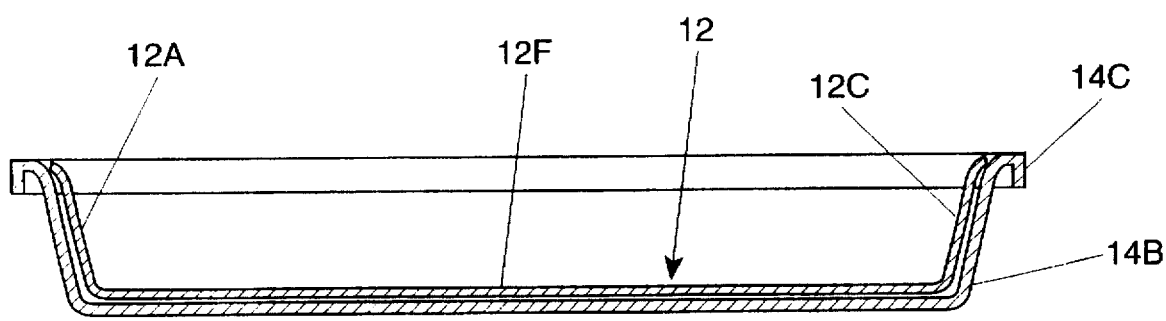
FIG. 2 is a cross section view along line A—A of FIG. 1 of a first fowl feed tray with liner.

Lastly, referring to FIG. 2 which is a cross section view of a first fowl feed tray with liner along a line A—A, having the following features: first liner (12), first liner left side (12A), first liner right side (12C), first liner base (12F), feed tray side (14B), and feed tray rim (14C).

The first liner (12) comprises the first liner left side (12A) which is securely bendably attached to the first liner base (12F) along a common edge. The first liner base (12F) is securely bendably attached along a common edge to the first liner right side (12C). The first liner left side (12A) and first liner right side (12C) are held in close cooperating relation with the feed tray side (14B) and feed tray rim (14C) by the rigidity of the material the first liner (12) is made therefrom. The first liner left side (12A) and first liner right side (12C) are sized to not to extend beyond the feed tray rim (14C) in a upwardly direction. This prevents the fowl from pulling the first liner left side (12A) and first liner right side (12C) inwardly during normal scratching and pecking movements.

It will be understood that each of the elements described above, or two or more together, may also find a useful application in other types of constructions differing from the type described above.

While the invention has been illustrated and described as embodied in a Fowl Feed Tray with Liner, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A fowl feed tray with liner (10) comprising:

A) a first liner (12) which comprises a first liner left side (12A) which is securely attached at one distal end to a proximal end of a first liner front (12B), the distal end of the first liner front (12B) is securely attached to a proximal end of a first liner right side (12C), the distal end of the first liner right side (12C) is securely attached to a proximal end of a first liner rear (12D), the first liner left side (12A) bottom edge is attached to a left edge of the first liner base (12F), the first liner front (12B) bottom edge is attached to a front edge of the first liner base (12F), the first liner right side (12C) bottom edge is attached to a right edge of the first liner base (12F), the first liner rear (12D) bottom edge is attached to a rear edge of the first liner base (12F), the intersection of each of the sides (12D, 12C, 12B, 12A) comprises a first liner corner (12E), the first liner corner (12E) comprises a plurality of first liner corner pleats (12EA) in alternating folds which function to permit the sides to fold upwardly forming a dish shape which is adapted to fit within a feed tray (14) when inserted along a first liner insertion/removal direction (12G), the first liner (12) is manufactured from a rigid absorbent material, the rigidity of the material functions to retain the first liner left side (12A), first liner front (12B), first liner right side (12C), and first liner rear (12D) in a close cooperating relation with feed tray sides (14B), the rigid material maintains the first liner left side (12A), first liner front (12B), first liner right side (12C), and first liner rear (12D) from falling inwardly;

b) the feed tray (14) comprises a plurality of sides complementary in length and height to the first liner left side (12A), first liner front (12B), first liner right side (12C), and first liner rear (12D), the first liner base (12F) is adapted to fit within a feed tray bottom (14A).

2. The fowl feed tray with liner (10) as described in claim 1, wherein the absorbent material is selected from the group consisting of paper, plastic, cellulose, fiberglass and synthetics.

3. The fowl feed tray with liner (10) as described in claim 2, wherein the absorbent material is crepe tissue which comprises a range of 60 gm/sqm to 140 gm/sqm.

* * * * *